(No Model.)
R. MORRIS.
FILTER.
No. 417,070. Patented Dec. 10, 1889.
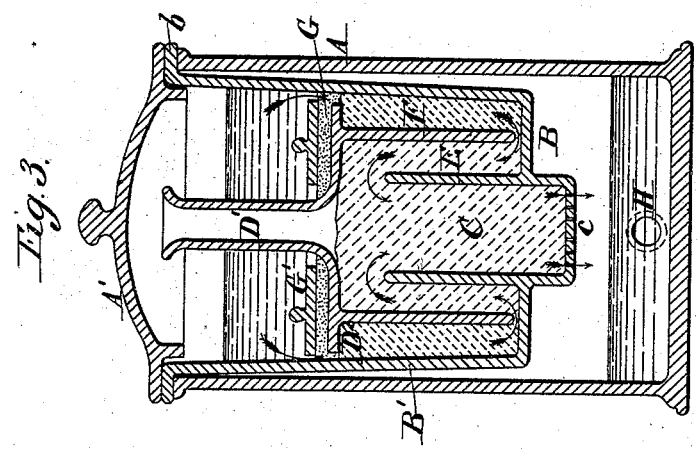
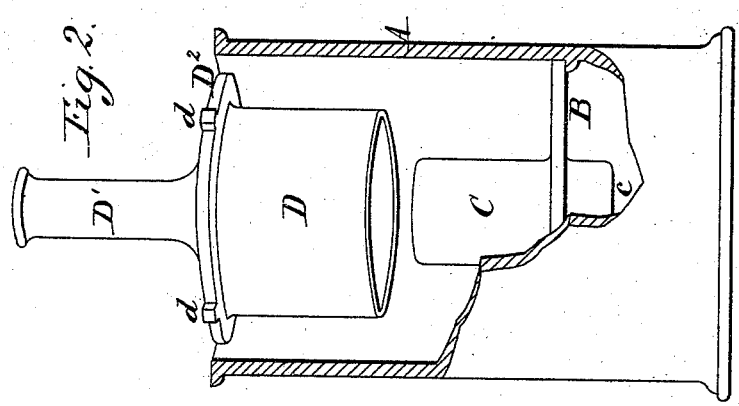
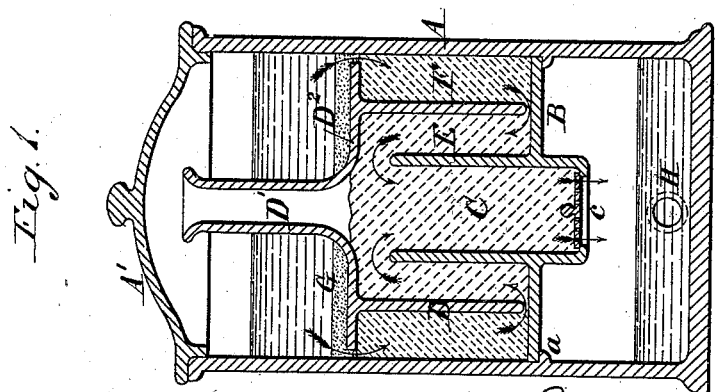

UNITED STATES PATENT OFFICE.

RICHARD MORRIS, OF BLACKHEATH, COUNTY OF KENT, ENGLAND.

FILTER.

SPECIFICATION forming part of Letters Patent No. 417,070, dated December 10, 1889.

Application filed July 3, 1889. Serial No. 316,455. (No model.) Patented in England January 5, 1888, No. 211; in France June 13, 1889, No. 198,912, and in Belgium June 15, 1889, No. 86,653.

*To all whom it may concern:*

Be it known that I, RICHARD MORRIS, a citizen of England, residing at Bennett Park, Blackheath, in the county of Kent, England, have invented a new and useful Improvement in Filters, (for which I have obtained patents in Great Britain, No. 211, dated January 5, 1888; France, No. 198,912, dated June 13, 1889, and Belgium, No. 86,653, dated June 15, 1889,) of which the following is a specification.

In filters as they are usually constructed the water has a short passage through the filtering material and completely saturates and covers it, so as to prevent access of air, which is necessary for the aeration of the water during its filtration.

This invention relates to a construction of filter in such a manner as to provide in compact form a lengthened course for the water through the filtering material, and also to provide complete aeration, the parts being so arranged as to give the utmost facilities for cleansing, as I shall describe, referring to the accompanying drawings.

Figure 1 is a vertical section of a filter according to my invention. Fig. 2 shows the internal parts separately. Fig. 3 shows a modified construction.

The outer vessel A, which may be of glass or stoneware, has a cover A' and is divided into an upper and a lower compartment by the partition B, which, as shown in Fig. 1, may be supported on a shoulder $a$, formed in the interior of the vessel A, or, as shown in Fig. 3, may be the bottom of an inner cylindrical vessel B', with a flange $b$, by which it rests on the top of A.

In the center and forming part of B is a central tube or chamber C, having a perforated bottom or strainer $c$ at some distance below B. A second vessel D, having an open-air tube D', is placed mouth downward, so as to form a partition dividing the space around C into two annular spaces E and F, with a narrow communication at the bottom.

The cover $D^2$ of the vessel D is of somewhat less diameter than the interior of A, Fig. 1, or of B', Fig. 2, and has studs $d$ projecting from its circumference to steady it in position.

In preparing the filter for use I charge the spaces C and E loosely with filtering material, preferably of a carbonaceous character, introduced through the air-tube D', and I charge the space F more tightly with sand introduced through the annular space around $D^2$. I also place a layer G of sand over the cover $D^2$, and to prevent this layer from being disturbed I may place over it a loose cover G', as shown in Fig. 3. Water poured into the upper part of the filter around but not into the tube D' percolates through the sand G, past the edge of $D^2$, down through the sand in F, up again through the material in G, and again down through the material in C and through the strainer $c$ into the lower part of the filter, whence it may be drawn when required by opening a cock H. Owing to the looseness of the filtering material in E and C as compared with that in F and to the extension of the central tube C below the bottom B, a siphon action takes place, draining the water from E and C more rapidly than it is supplied through F, and thus the material in E and C, instead of being saturated with water and covered by it, remains comparatively dry and exposed to aeration through the tube D', so that the filtered water receives the sharpness of flavor due to thorough aeration.

When it is desired to cleanse the filter, the cover A' is removed, the vessel D is raised by taking hold of the tube D', then B and its contents can be lifted, and thus every part of the filter is exposed.

Having thus described the nature of my invention and the best means I know for carrying the same into practical effect, I claim—

A filter consisting of an outer case or vessel A, divided by a partition B, having a central tube C, projecting upward, and a part projecting downward and terminating in a strainer c, in combination with an inverted vessel D, provided with an air-tube D', substantially as described.

In testimony whereof I have signed my name to this specification, in the presence of two subscribing witnesses, this 18th day of June, A. D. 1889.

RICHARD MORRIS.

Witnesses:
OLIVER IMRAY,
Patent Agent, 28 Southampton Buildings, London, W. C.
JNO. P. M. MILLARD,
Clerk to Messrs. Abel & Imray, Consulting Engineers and Patent Agents, 28 Southampton Buildings, London, W. C.